(12) United States Patent
Emerson et al.

(10) Patent No.: US 12,481,798 B2
(45) Date of Patent: Nov. 25, 2025

(54) AUTOMATED DESIGN OF PROCESS AUTOMATION FACILITIES

(71) Applicant: Yokogawa Electric Corporation, Tokyo (JP)

(72) Inventors: David Emerson, Coppell, TX (US); Ichiro Wake, Tokyo (JP); Patrick Clay, Frisco, TX (US); Vien Nguyen, Frisco, CA (US); Hidenori Sawahara, Spring, TX (US); Mark Hammer, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 925 days.

(21) Appl. No.: 17/678,181

(22) Filed: Feb. 23, 2022

(65) Prior Publication Data

US 2025/0217525 A1 Jul. 3, 2025

Related U.S. Application Data

(63) Continuation of application No. 17/510,039, filed on Oct. 25, 2021.

(51) Int. Cl.
*G06F 30/13* (2020.01)
*G05B 19/418* (2006.01)
(Continued)

(52) U.S. Cl.
CPC .......... *G06F 30/13* (2020.01); *G05B 19/418* (2013.01); *G06F 30/27* (2020.01); *G06N 3/02* (2013.01); *G06F 2111/04* (2020.01)

(58) Field of Classification Search
CPC .......... G06F 30/00; G06F 30/13; G06F 30/27; G06F 2111/04; G05B 19/418; G06N 3/02
(Continued)

(56) References Cited

U.S. PATENT DOCUMENTS 9,904,746 B2 2/2018 McKim et al.
10,496,061 B2 12/2019 Strohmenger et al.
(Continued)

FOREIGN PATENT DOCUMENTS

JP 05002615 1/1993
JP 2016053337 4/2016
(Continued)

OTHER PUBLICATIONS van der Aa, Han et al., "Automatically Identifying Process Automation Candidates Using Natural Language Processing", Blockchain and Robotic Process Automation, Jul. 8, 2021, The Authors, Springer Nature Switzerland AG. (Year: 2021).*

(Continued)

*Primary Examiner* — Cedric Johnson
(74) *Attorney, Agent, or Firm* — Gray Ice Higdon

(57) ABSTRACT

Implementations herein leverage knowledge about historical process automation facilities to automate designing a new process automation facility. A first level design input may be processed to generate a first embedding that encodes design aspect(s) of the requested process automation facility with a degree of detail commensurate with a first level of a hierarchy reflected by design documents typically used to design a process automation facility. The first embedding may be used to find first level reference embeddings that encode design aspects of reference process automation facilities. Second level reference embedding(s) may be identified based on mapping(s) from the selected first level reference embedding(s). Each second level reference embedding may encode design aspect(s) of a respective reference process automation facility with a degree of detail that is commensurate with a second level of the design document hierarchy. Based on the second level reference embedding(s), template design document(s) may be provided.

20 Claims, 9 Drawing Sheets

(51) Int. Cl.
  *G06F 30/27* (2020.01)
  *G06N 3/02* (2006.01)
  *G06F 111/04* (2020.01)

(58) Field of Classification Search
  USPC .......................................................... 703/1
  See application file for complete search history.

(56) References Cited

U.S. PATENT DOCUMENTS

| | | | |
|---|---|---|---|
| 2020/0265329 A1 | 8/2020 | Thomsen et al. | |
| 2021/0133670 A1* | 5/2021 | Cella | G06N 3/044 |
| 2022/0036302 A1* | 2/2022 | Cella | H04L 67/1097 |

FOREIGN PATENT DOCUMENTS

| | | |
|---|---|---|
| JP | 2019175007 | 10/2019 |
| JP | 2020102115 | 7/2020 |
| JP | 6843315 | 3/2021 |

OTHER PUBLICATIONS

"A Single Data Foundation for Operations and Analysis: Stop Wrestling With Plant Data and Start Using It" Sight Machine 2021. Retreived from https://sightmachine.com/. 10 pages.

Lo et al., "Architectural Patterns for the Design of Federated Learning Systems" arXiv:2101.02373v3 [cs.LG] dated Jun. 18, 2021. 19 pages.

Christensen et al., "The IEC 61499 Function Block Standard: Overview of the Second Edition" ISA Automation Week 2012. Retreived from https://www.researchgate.net/publication/235225081. 13 pages.

International Search Report and Written Opinion issued for Application No. PCT/IB2022/059751, 8 pages, dated Jan. 10, 2023.

Japan Patent Office; First Office Action issued for Application No. 2024-524739, 10 pages, dated Jun. 17, 2025.

Japan Patent Office; Second Office Action issued for Application No. 2024-524739, 10 pages, dated Sep. 16, 2025.

* cited by examiner

AUTOMATED DESIGN OF PROCESS AUTOMATION FACILITIES

CROSS REFERENCE TO RELATED APPLICATION

The present application is a continuation of U.S. patent application Ser. No. 17/510,039, filed on Oct. 25, 2021, the disclosure of which is hereby incorporated herein by reference.

BACKGROUND

Process automation facilities are increasingly being implemented as distributed computing environments, e.g., with large numbers of process automation hardware such as distributed control nodes (DCNs) connected to a process automation network. Designing process automation facilities from scratch requires considerable expertise and/or experience, and consequently, tends to be costly both financially and in terms of time. In addition, a requested process automation facility may have many similarities to reference process automation facilities such as process automation facilities that currently exist and/or that existed in the past. However, the knowledge gained by those personnel that designed and implemented those reference process automation facilities may not be readily transferable to other personnel.

Implementations are described herein for capturing, organizing, and leveraging knowledge associated with the design and/or implementation of reference process automation facilities to automate aspects of designing new process automation facilities and/or updating existing process automation facilities. More particularly, but not exclusively, implementations are described herein for processing information about reference process automation facilities to generate what will be referred to herein as "federated information models." The federated information models may be used as reference points for designing a new process automation facility, e.g., by automatically generating and/or providing template design documents.

In some implementations, a method for designing at least part of a requested process automation facility may be implemented using one or more processors and may include: processing a first level design input about the requested process automation facility to generate a first embedding, wherein the first embedding encodes design aspects of the requested process automation facility in a degree of detail that is commensurate with a first level of a hierarchy of design documents typically associated with designing process automation facilities; comparing the first embedding to a plurality of first level reference embeddings to select one or more first level reference embeddings that satisfy a first criterion, wherein the plurality of first level reference embeddings encode design aspects of a respective plurality of reference process automation facilities at the first level of the design document hierarchy; identifying one or more second level reference embeddings based on one or more mappings from the selected one or more first level reference embeddings, wherein each of the one or more second level reference embeddings encodes design aspects of a respective one of the plurality of reference process automation facilities at degree of detail that is commensurate with a second level of the design document hierarchy that is beneath the first level of the design document hierarchy; and based on the identified one or more second level reference embeddings, providing one or more template design documents for the requested process automation facility.

In various implementations, the first level design input about the request process automation facility may be a process flow diagram, and the one or more template design documents for the requested process automation facility may include a template piping and instrumentation diagram (P&ID) of at least a portion of the requested process automation facility.

In various implementations, the first level design input about the request process automation facility may include a natural language input, and the one or more template design documents for the requested process automation facility may include a template process flow diagram (PFD) or template piping and instrumentation diagram (P&ID) of at least a portion of the requested process automation facility.

In various implementations, the first level design input about the request process automation facility may include information about a central control room of the requested process automation facility, and the one or more template design documents for the requested process automation facility may include a template design of a field equipment room (FER) of the requested process automation facility.

In various implementations, processing the first level design input to generate the first embedding may include: generating a graph based on the first level design input; and processing the graph based on one or more machine learning models to generate the first embedding. In various implementations, one or more of the machine learning models may be a graph neural network (GNN). In some implementations, the graph may include a plurality of nodes representing a plurality of processes to be implemented in the requested process automation facility, and a plurality of edges that define relationships between the plurality of processes. In other implementations, the graph may include a plurality of nodes representing a plurality of process automation nodes to be implemented in the requested process automation facility, and a plurality of edges that represent network communication channels between the plurality of process automation nodes. In some implementations, the graph may include one or more nodes representing one or more modular automated process assemblies to be implemented in the requested process automation facility, and a plurality of edges that define relationships between the one or more pre-planned process automation assemblies and other elements of the requested process automation facility.

In various implementations, one or more of the template design documents may be generated based on intransient elements shared amongst the plurality of reference process automation facilities. In various implementations, the first design input may include input/output (I/O) information for a process unit of the process automation facility, and the processing may include calculating a number of distributed control nodes (DCNs) for the process unit.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for capturing, organizing, and leveraging knowledge associated with the design and/or implementation of reference process automation facilities to automate aspects of designing new process automation facilities and/or updating existing process automation facilities. More particularly, but not exclusively, implementations are described herein for processing information about reference process automation facilities to generate what will be referred to herein as "federated information models." The federated information models may be used as reference points for designing a new process automation facility, e.g., by automatically generating and/or providing template design documents.

In various implementations, machine learning techniques may be employed to leverage knowledge stored in federated information models to automate aspects of, or "bootstrap," the design of new process automation facilities or updates of existing process automation facilities. For example, in some implementations, when a new process automation facility is requested, the requestor (e.g., customer) may provide at least some level of detail and/or documentation of what they want. Initially, this level of detail may be relatively abstract. For example, the customer may provide high-level documentation of what they want, e.g., process flow diagram (PFD) that was created, for instance, by a chemical engineer, or even a free-form narrative of what the customer needs to accomplish. This high-level documentation may be processed, alone or in combination with other data (e.g., natural language input, a transcript of a telephone call, etc.) to generate a semantically-rich embedding.

This semantically-rich embedding may then be compared to a plurality of first-level reference embeddings to select one or more first level reference embeddings that satisfy a first criterion. The plurality of first level reference embeddings may encode design aspect(s) of a respective plurality of reference process automation facilities at a level of detail or abstraction that is commensurate with the level of detail or abstraction provided by the customer. The criterion may include, for instance, those N (positive integer) reference embeddings that are most similar or "closest" to the semantically-rich embedding generated from the user input, or those reference embeddings that satisfy some similarity threshold. Such similarity may be computed in a variety of different ways, including but not limited to cosine similarity, dot product, Euclidean distance, etc.

Figure 3:
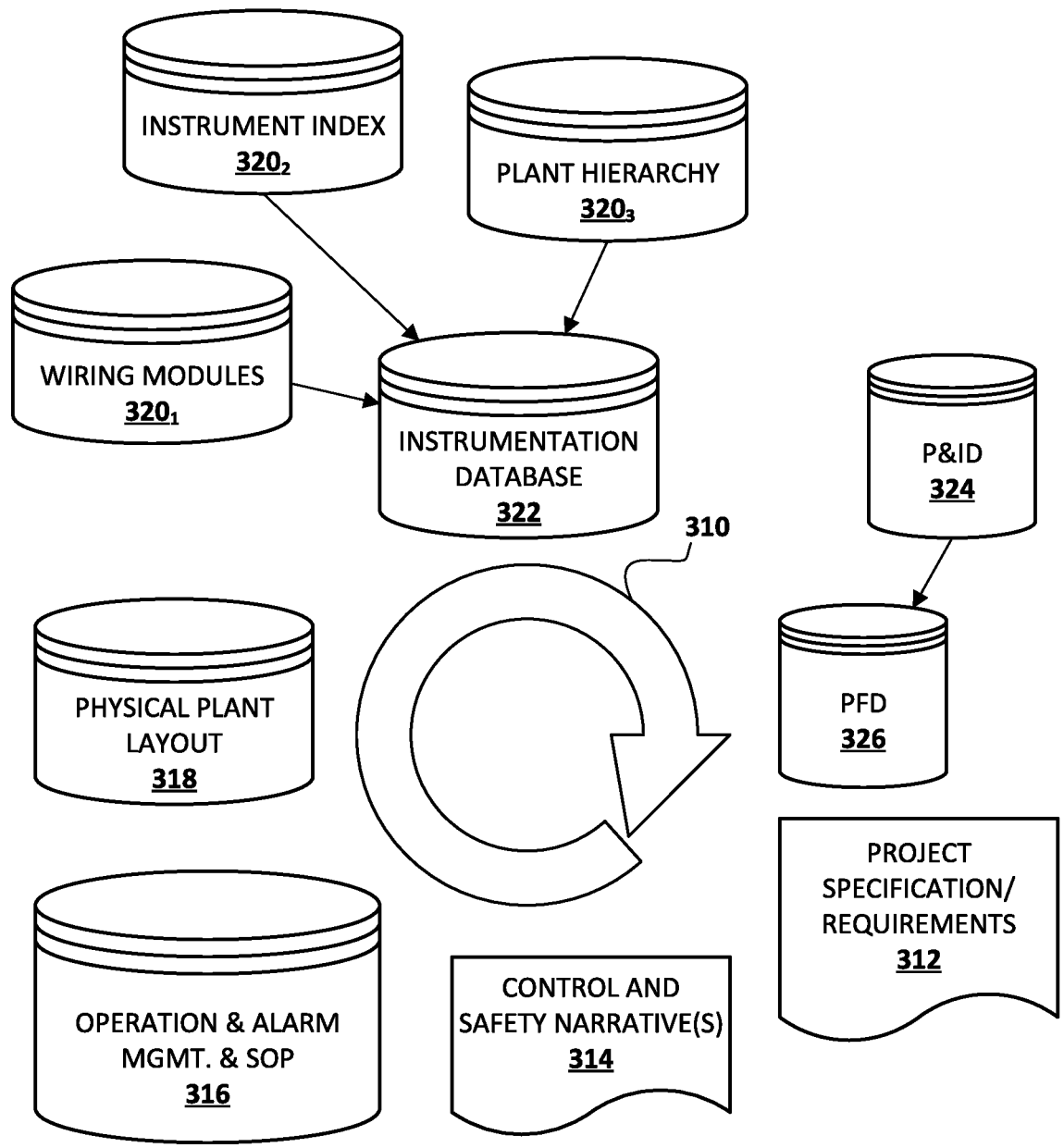
FIG. 3 schematically depicts an example of a design cycle of a process automation facility, in accordance with various implementations.

As an example, suppose a customer provides a PFD as a design input. The PFD may contain a level of detail that is commonly found in PFDs. More generally, the PFD may contain a level of detail that is commensurate with a first level of a design document hierarchy associated with designing process automation facilities. A design document hierarchy may reflect levels of abstraction or detail contained in design documents provided at various stages of designing and/or building a process automation facility. Each level of the design document hierarchy may reflect documents having levels of detail or abstraction that are typically associated with particular stages of the design process. FIG. 3 depicts a design process cycle that depicts the different stages, and thus different levels, of such a hierarchy of design documents. Returning to this example, the reference embeddings may include a similar level of detail or abstraction, e.g., an amount of detail that might be found in PFDs created for the reference process automation facilities, or more generally, an amount of detail commensurate with the first level of the design document hierarchy.

For example, PFDs originally created during development of those reference process automation facilities may be used to generate the first-level reference embeddings, e.g., in real time or beforehand. Alternatively, the first-level reference embeddings may include much greater detail (e.g., greater number of populated dimensions), e.g., generated from comprehensive detail about the reference process automation facilities. In the latter case, the semantically-rich embedding generated based on the corresponding customer's input may have similar dimensions, but many of those dimensions will be unpopulated because the customer did not provide those details. In yet other implementations, the customer's input may be used to populate as many dimensions as possible. Then, those same dimensions of reference embeddings may be populated from relevant data points contained in federated information models associated with the reference process automation facilities.

Once the one or more first-level reference embeddings are identified, in various implementations, they may be leveraged, as representations of knowledge of reference process automation facilities, to automate design of aspects of the requested process automation facility. For example, in some implementations, each of the one or more first-level reference embeddings may be mapped, e.g., via a function such as a trained feed-forward neural network, to one or more second-level reference embeddings. Each of the one or more second level reference embeddings may encode "second level" information about a respective one of the plurality of reference process automation facilities. Second level information may refer to a level of detail or abstraction that is commensurate with a second level of the aforementioned design document hierarchy. Documents in the second level of the design document hierarchy may have more details and/or narrower scope than documents of the first level of the design document hierarchy. Based on the identified one or more second level reference embeddings, one or more template design documents for the requested process automation facility may be provided, e.g., as a starting point for designing the requested process automation facility.

As one example, the second-level reference embeddings may contain more details than PFDs, such as details that are commensurate with the level of detail found in piping and instrumentation diagrams (P&ID). Thus, for instance, a customer could provide a high-level PFD, which may be processed into a first embedding. This first embedding may be used to find one or more similar first level reference embeddings representing PFD-level of detail in one or more reference process automation facilities. These one or more first level reference embeddings may each be mapped to one or more second-level reference embeddings that each represent P&ID-level detail (e.g., by having been generated from actual P&IDs) of the one or more reference process automation facilities. These details may then be used to generate, or retrieve if already existing, a template P&ID of at least a portion of the requested process automation facility.

Permutations outside of finding similar PFDs and generating P&IDs are contemplated. For example, in some implementations, the customer may provide, as first level information, details about a central control room (CCR) of the requested process automation facility. These CCR details may include, for instance, details about human-machine interfaces (HMIs), alarms, distributed control system (DCS) controllers, safety information system (SIS) controllers, fire and gas system (FGS) controllers, asset management systems, advanced process control, 3rd party systems, etc. An embedding may be generated using these various details. As described previously, this embedding may be compared to reference embeddings that represent CCRs of reference process automation facilities. The most similar N (positive integer) first level reference embeddings may map to some number of second level reference embeddings. These second level reference embeddings may represent, for instance, details about field equipment rooms (FERs) in those reference process automation facilities. Thus, the second level reference embeddings can be used to generate template designs, I/O summaries and/or lists for FER(s) in the requested process automation facility.

In some implementations, there may be some form of selection from the second-level reference embeddings, e.g., based on one or more additional criteria. For example, the first level information provided by the customer may include a greater level of detail than would be contained in a PFD. The details provided by the customer in the first level information that are commensurate with details typically found in a PFD may be used to identify one or more first level reference embeddings. Then, additional details provided by the customer, which may or may not have been used to find the first level reference embeddings, may be used to select from a plurality of second level reference embeddings that are mapped to by the one or more first level embeddings.

In some implementations, the customer may provide information incrementally, and at each increment, additional searching may be performed. For example, the customer may provide a PFD as an initial input. This may be used to select any number of first level reference embeddings as potential matches. The customer may then provide additional input, e.g., in response to a prompt requesting additional detail that might narrow down the search space of first level embeddings further or that might be usable to narrow down the search space for second level embeddings. For example, the customer may provide natural language input describing additional details of their desired process automation facility, or may indicate a particular portion (e.g., CCR, FER) of the requested process automation facility that they'd like to design or have designed first.

Process automation facilities and/or aspects thereof may be represented in federated information models in various ways. In some implementations, a process automation facility may be represented in whole or in part by one or more graphs. Representing entire process automation facilities or portions thereof (e.g., FERs, P&IDs, PFDs, circuit diagrams, network topologies, etc.) as graphs may allow for the use of machine learning models, such as graph neural networks (GNNs), to process graphs to generate embeddings that semantically represent not only the nodes of the graphs, but the relationships between the nodes of the graph. Thus, by representing the first level information provided by the user as a graph, and/or by representing aspects of reference process automation facilities as graphs, it is possible to generate embeddings that represent not only individual components of process automation facilities, but the relationship(s) between those components. This makes the various comparisons of embeddings described herein more accurate.

As one example, a first level graph may be used to represent an entire process automation facility or portion thereof. Such a first level graph may include, for instance, a plurality of nodes representing a plurality of processes to be implemented in the requested process automation facility. A plurality of edges may also be included and may define relationships between the plurality of processes. Such a graph may have a level of detail commensurate with a particular level of the design document hierarchy, such as a level that includes PFDs and other similarly-detailed documents.

As another example, one or more second level graphs may be used to represent one or more portions of the process automation facility at the level of detail that is commensurate with a different level of the design document hierarchy. For example, a second level graph may include a plurality of nodes representing a plurality of process automation nodes (e.g., DCNs, input/output nodes, etc.) to be implemented in the requested process automation facility. The graph may also include a plurality of edges that represent, for instance, network communication channels between the plurality of process automation nodes.

As noted previously, a process automation facility may include a very large number of process automation nodes. Representing each node individually, e.g., as a node in a graph, may result in an unwieldy amount of data. Many assemblies of process automation nodes are used repeatedly, e.g., across multiple process automation facilities. For example, an air dryer may include some number of process automation nodes (e.g., hundreds) that cooperate to automate an air drying process. Such an assembly may be designed to be modular, e.g., prefabricated and/or pre-planned, so that it can be used in the same or substantially similar way in multiple different process automation facilities. In some implementations in which a graph is used to represent at least a portion of a process automation facility, one or more nodes may represent one or more pre-planned modular automated process assemblies to be implemented in the requested process automation facility. At least some edges of the graph may define relationships between the one or more pre-planned process automation assemblies and other elements of the requested process automation facility.

Examples described herein have been primarily involved with first finding more abstract and/or less detailed (e.g., first level) embeddings, and then mapping those abstract embeddings to second level embeddings that are less abstract and more detailed. However, this is not meant to be limiting. These mappings may be used in other ways to bootstrap and/or otherwise automate process automation facility design. For example, less abstract embeddings (e.g., representing P&IDs, individual FERs) may map to more abstract embeddings (e.g., representing PFDs, CCRs, control and safety narratives, etc.). As another example, embeddings may map to other embeddings of commensurate levels of abstraction. For example, an embedding representing one FER may map to embeddings representing one or more other FERs that are compatible with the first FER, e.g., as fellow subordinates of a CCR. In terms of the design document hierarchy, embeddings of any level of the design document hierarchy may map to embeddings of any other level of the design document hierarchy, including the same level.

To demonstrate, suppose a customer provides, as input, information about one or more sub-portions of a requested process automation facility. For example, the customer may provide information about one or more of the aforementioned modular automated process assemblies that they would like incorporated into their plant. In some implementations, one or more embeddings may be generated based on features of these modular automated process assemblies. For example, each assembly may be represented as a graph. In some cases a larger graph may be constructed based on the individual graphs of each assembly (and based on heuristics that embody common process flows), although this is not required. Techniques such as GNNs may then be applied to generate a semantically rich embedding that can be mapped to, for instance, reference embeddings usable to design a CCR and one or more FERs to accommodate the desired arrangement of modular automated process assemblies. In some such implementations, such a graph may include a plurality of nodes representing a plurality of processes to be implemented in the requested process automation facility, and a plurality of edges that define relationships between the plurality of processes. In other such implementations, the graph may include a plurality of nodes representing a plurality of process automation nodes to be implemented in the requested process automation facility, and a plurality of edges that represent network communication channels between the plurality of process automation nodes.

Figure 1:
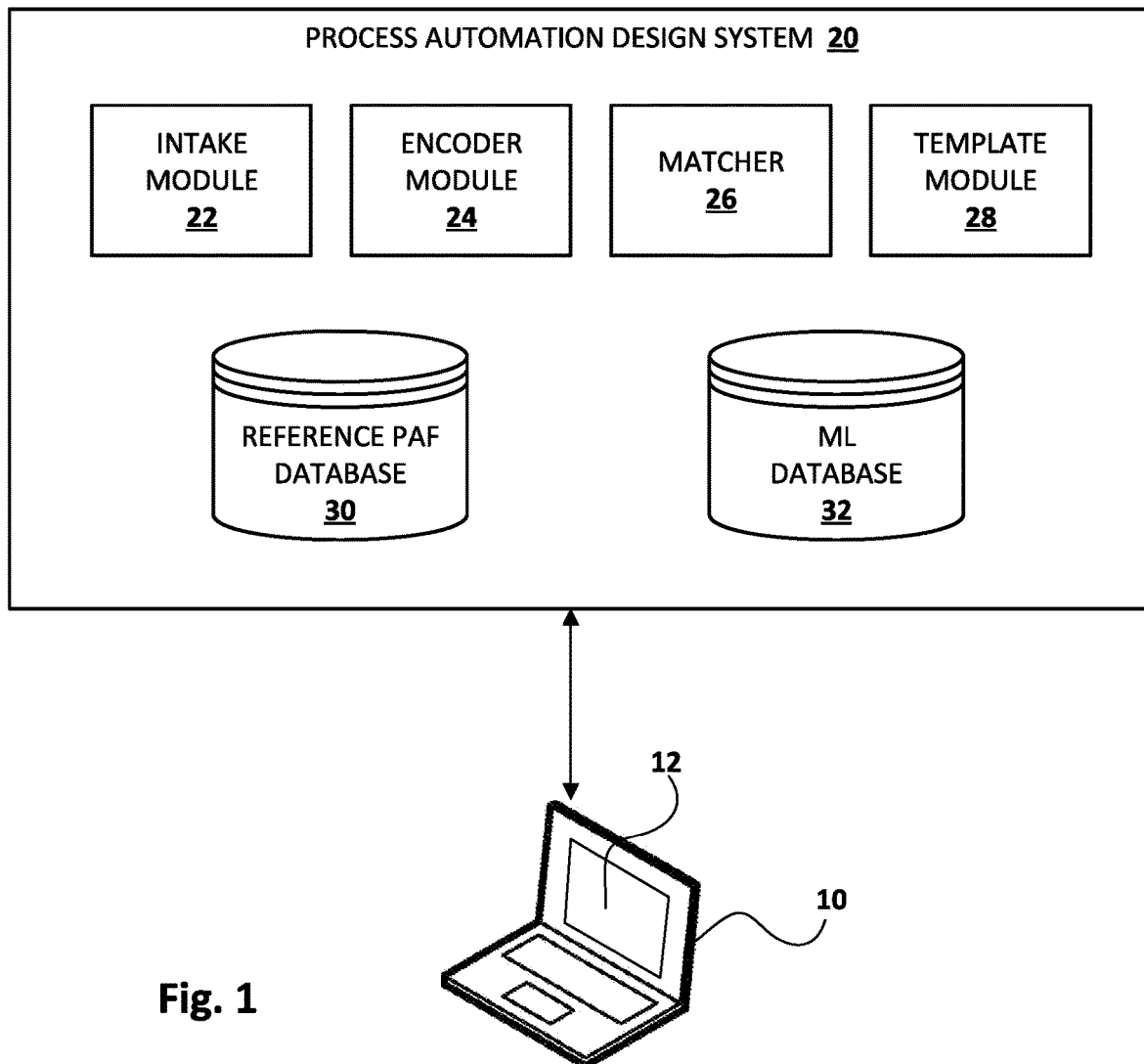
FIG. 1 schematically depicts an example environment in which selected aspects of the present disclosure may be implemented.

FIG. 1 schematically depicts an example environment in which selected aspects of the present disclosure may be implemented, in accordance with various embodiments. A user (not depicted) such as a representative of an end customer (e.g., a company) that desires a new process automation facility or wishes to modify and/or update an existing facility may operate a client device 10 to interact with an integrated development environment (IDE) 12 to design aspects of the desired process automation facility. IDE 12 may communicate with a process automation design system 20, e.g., directly or over one or more computer networks (not depicted).

Process automation design system 20 may be configured with selected aspects of the present disclosure to facilitate at least partially automated design of process automation facilities. Process automation design system 20 may include an intake module 22, an encoder module 24, a matcher 26, and a template module 28. One or more of modules 22-28 may be combined with others of modules 22-28, implemented outside of process automation design system 20 (e.g., wholly or in part on client device 10), and so forth. In some implementations, process automation design system 20 may be implemented on one or more server computer systems that form what is often referred to as a "cloud infrastructure" or simply the "cloud."

Process automation design system 20 may also include one or more databases for storing various information used, altered, or created by modules 22-28. For example, a reference process automation facility ("PAF" in FIG. 1) database 30 may include information about reference process automation facilities, whether still in existence or having existed sometime in the past. In some implementations, information about a given reference process automation facility may be stored in database 28 as a "federated information model." A federated information model may organize information about the given reference process automation facility in a consistent and standardized manner. Thus, the same type of information about different reference process automation facilities may be accessed using similar techniques, such as the same function call.

In some implementations, a federated information model may organize information about a reference process automation facility as a graph, e.g., with nodes representing process automation nodes (e.g., DCNs) and edges representing logical and/or communication pathways between the process automation nodes. In some such implementations, such a graph may be encoded, e.g., by encoder module 24, into a semantically-rich embedding that represents various aspects of the reference process automation facility at a selected dimensionality and/or level of detail that is commensurate with some level of a design document hierarchy. For example, a GNN or other similar machine learning model may be used, e.g., by encoder module 24, to encode individual nodes of the graph into embeddings. These embeddings may then be propagated to neighboring nodes along edges for some number of iterations (which may be a hyperparameter of the GNN). Data propagated along an edge may be processed, e.g., by encoder module 24, using a machine learning model such as a feed-forward neural network. A neighbor's data may be integrated and/or combined with a given node's data in various ways, such as concatenation, averaging, etc. The more iterations of the GNN, the more information from increasingly remote nodes is incorporated into each given node.

A machine learning (ML in FIG. 1) database 32 may store a variety of different machine learning models (e.g., weights associated with those machine learning models) that are employed using techniques described herein. For example, ML database 32 may store machine learning model(s) that are used: by intake module 22 to capture data from different design documents or other data sources about reference process automation facilities, to generate federated information models or portions thereof, and/or to generate reference embeddings that may or may not form part of federated information models; by encoder module 24 to generate semantic embeddings from different design inputs; by matcher 26 to match semantic embeddings to other similar semantic embeddings; by template module 28 to obtain information that is stored in reference PAF database 30 as part of a federated information model; and so forth.

Intake module 22 may be configured to employ any number of techniques to capture, obtain, retrieve, collect, and/or otherwise acquire information about reference process automation facilities. Intake module 22 may then process this captured information into a federated information model. Intake module 22 may store this federated information model in reference PAF database 30. Subsequently, individual data points or collections of data points can be easily retrieved from this federated information model.

Intake module 22 may process a variety of different types of documents in order to obtain this data. These documents may be structured or unstructured. A structured document may include, for instance, a markup language document (e.g., XML, JSON), a vector-based graphic file, or other similar types of documents (e.g., ODF, VSD, VSDX, XPS, etc.) that are created and/or modified using a suitable software application. Due to its known structure, a structured document may be processed in an orderly fashion to extract information, e.g., using rules, heuristics, etc. An unstructured document, by contrast, may lack such underlying structural details. An unstructured document may include, for instance, a raster image file or a raster portable document format (PDF) file, or a document containing narrative natural language prose. Extracting information from an unstructured document may be performed, for instance, using object recognition, optical character recognition (OCR), natural language processing (NLP), and so forth.

In some implementations, one or more machine learning models, such as a convolutional neural network (CNN), may be trained using supervised or unsupervised techniques so that it can be used by intake module 22 to automatically extract information of interest from unstructured documents. As an example, the machine learning model may be trained using labeled raster blueprints of a plant's physical layout in which visual elements of interest (e.g., FERs, CCR, instruments, tags, etc.) are annotated with ground truth annotations such as bounding boxes and/or pixel-wise annotations. These annotated images may be processed using the machine learning model to generate output, which may include extracted features in the form of predicted annotations. The output (e.g., predicted annotations) may then be compared to the ground truth annotations to generate an error. Based on this error, techniques such as back propagation and gradient descent may be performed to train weights of the machine learning model.

In some implementations, structured documents may be leveraged to create synthetic training data that can supplement or replace human-labeled training data. For example, a vector-based graphics file depicting a physical plant layout may be rasterized into an unstructured version where visual elements from which features may be extracted are pre-rendered with annotations, such as bounding boxes, pixel-wise annotations, etc. These rasterized and annotated images may be used to train the machine learning model as described previously.

Once trained, the machine learning model may be used, e.g., by intake module 22, to process unlabeled unstructured documents to extract pertinent information and/or features. For example, features elements depicted in FIG. 2, such as central control room (CCR) 201, one or more field equipment rooms (FERs) $202_{1-N}$, junction boxes (JB), instruments $204_{1-N}$, and/or the connections or edges between them, may be extracted. These features may be used, e.g., by intake module 22, to generate a reference embedding that is readily comparable (e.g., by matcher 26) to other embeddings. Mappings from these reference embeddings may lead to other reference embeddings that represent other documents having levels of detail commensurate with different levels of the design document hierarchy. The documents represented by these other reference embeddings may be used, e.g., by template module 28, to generate template architecture documents, such as P&IDs, PFDs, circuit diagrams, network topology plans/diagrams, etc.

Encoder module 24 may be configured to obtain information, such as data extracted from design inputs or other reference process automation facility information by intake module 22, and encode this information into semantic embeddings (or simply, "embeddings"). In the context of reference information stored in reference PAF database 30, encoder module 24 may encode all or portions of federation information models that represent reference automation facilities. For example, an entire reference process automation facility may be represented as a hierarchy of graphs. Encoder module 24 may encode this hierarchy of graphs into one or more embeddings, e.g., using a machine learning model such as a GNN that is stored in ML database 32. Such embeddings may be readily compared, e.g., by matcher 26, to other similarly-created reference embeddings, such as reference embeddings that are generated from graphs created based on design inputs that describe a to-be-built process automation facility, to determine measures of similarities.

As alluded to above, matcher 26 may be configured to compare data indicative of process automation facilities to data indicative of other process automation facilities to find "matches." As used herein, a match may be found where two or more process automation facilities are sufficiently similar to each other that design documents created for one of the process automation facilities can be leveraged to provide template design documents for the other(s). When comparing semantic embeddings, matcher 26 may use techniques such as Euclidean distance, cosine similarity, dot product, etc. Otherwise, matcher 26 may use various rules and/or heuristics to compare individual data points that may or may not be weighted in various ways depending on a variety of factors. As one non-limiting example, the type or overarching goal of a process automation facility (e.g., gas refining, hydraulic fracturing) may be weighted more heavily than other factors such as lower level design choices within FERs, for instance.

In some implementations, template module 28 may be configured to retrieve, obtain, generate, and/or provide template design documents to a user of client device 10 based on the operations performed by modules 22-26. For example, if the user provides, at client device 10, a high-level control narrative for a desired process automation facility, template module 28 may return one or more lower level design documents, such as physical plant layouts (see FIG. 2 for an illustrative example), PFDs, P&IDs, circuit diagrams, network topologies, and any other design document is based on one or more reference process automation facilities.

Figure 2:
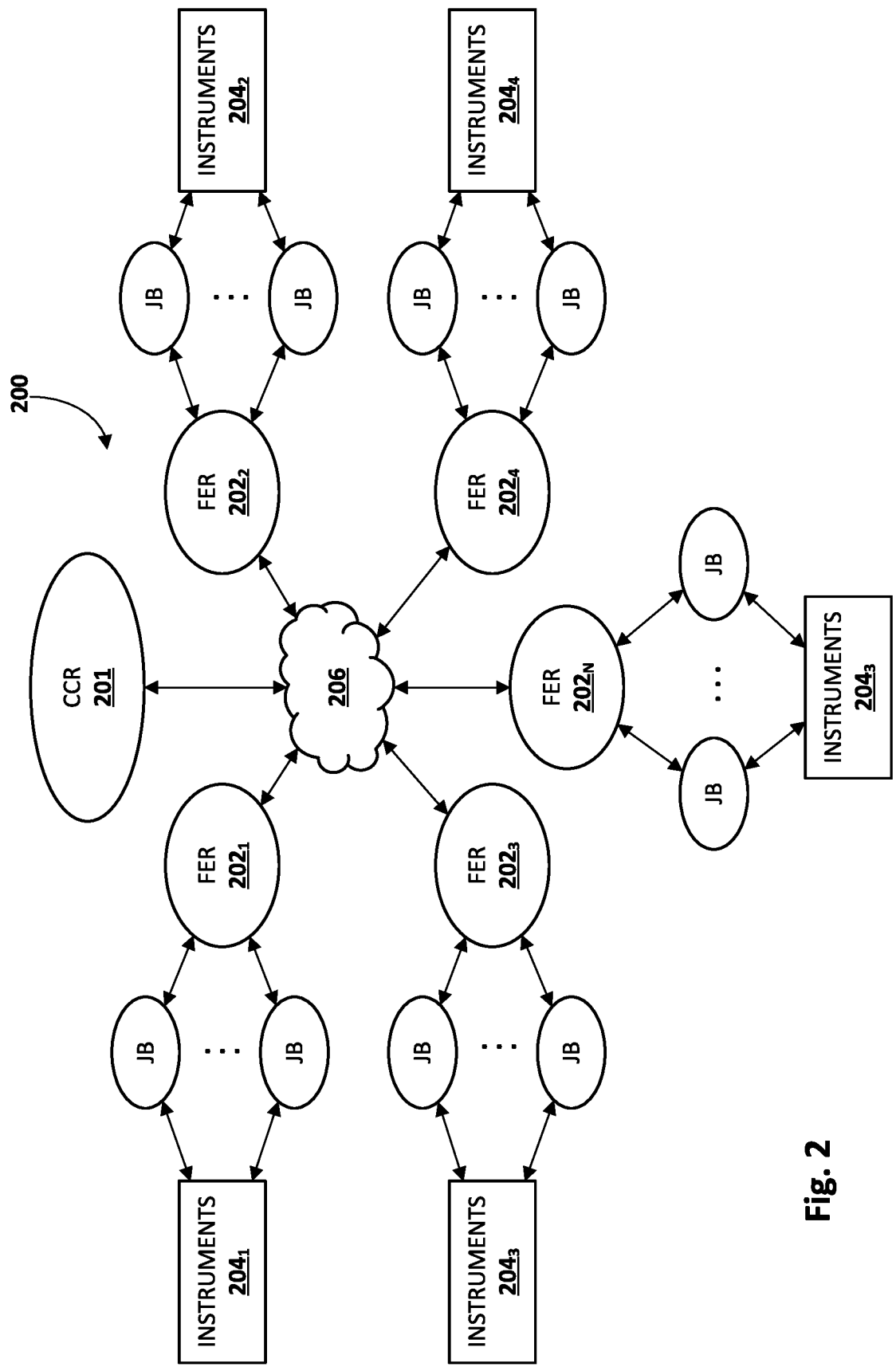
FIG. 2 schematically depicts an example physical plant layout for a process automation facility, in accordance with various implementations.

FIG. 2 schematically depicts an example of a physical plant layout 200 for a process automation facility. What is depicted in FIG. 2 could be contained, for instance, in a structured or unstructured document. Intake module 22 may process such a document to extract relevant features. These features may be used, e.g., by intake module 22, to generate a federated information model that is stored in database 30. Additionally or alternatively, these features may be encoded by encoder module 24 to create a semantic embedding that represents physical plant layout 200 in a form that is readily comparable to other, similarly-created embeddings.

Starting at the top, a central control room (CCR) 201 may include various equipment that can be used to control the process automation facility. These equipment may include, but are not limited to, one or more computing systems, circuitry, and/or hardware that implement and/or otherwise provide human-machine-interfaces (HMI) to control: an alarm management system; distributed control system (DCS), safety instrumented system (SIS), and/or fire and gas system (FGS) controllers; open platform communication (OPC) server(s); an asset management system; a historian and/or logging system; advanced process control system(s); third party systems and/or controllers; and so forth.

A plurality of field equipment rooms (FER) $202_{1-N}$ (N being a positive integer) are depicted as being in network communication with CCR 201 via one or more process automation networks 206. Process automation network 206 may include one or more personal area networks (PANs) such as a Bluetooth network, one or more local area networks (LANs) such as a Wi-Fi network, one or more mesh networks (e.g., Z-Wave, ZigBee), and/or one or more wide area networks (WANs) such as the Internet. If the process automation facility is viewed as a hierarchy, then FERs $202_{1-N}$ may be viewed as subordinate to and/or lower level than CCR 201. In various implementations, a FER 202 may include a subset of the HMI's available in CCR 201, such that those HMI's in the FER 202 may be operated to control only a portion of the process automation facility. For example, a FER 202 does not necessarily include an HMI for an OPC server or an asset management system, although this is not meant to be limiting.

Each FER 202 may be operably coupled with respective instruments 204 via one or more junction boxes (JB). Junction boxes are enclosures, usually constructed with plastic and/or metal, for housing wire connections, and in many cases include passive electronic components such as fuses, relays, and so forth. In some implementations, one or more of the junction boxes may take the form of a "smart" junction box. A "smart" junction box may integrate a microcontroller or other similar circuitry with relays and/or fuses to facilitate greater control. Instruments 204 associated with (e.g., controllable using HMIs of) an FER 202 may include, for instance, input/output elements such as actuators or sensors, as well as other process automation nodes such as DCNs 210.

Some non-limiting examples of actuators include, but are not limited to, valves, pistons, rotors, switches, heaters, coolers, stirrers, injectors, devices to create vacuums, belts, tracks, gears, grippers, motors, relays, servomechanisms, etc. A sensor may take various forms, including but not limited to a pressure sensor, a temperature sensor, a flow sensor, various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and so forth.

FIG. 3 schematically depicts, at a high level, an example process for designing and/or developing a process automation system/facility. The development process is depicted as a cycle 310 because the process often involves multiple iterations in which various types of design inputs are received from various entities, such as the end customer that requested the system, engineering, procurement and construction (EPC) personnel involved in the design and/or implementation process, and so forth. In many cases, the design inputs received during each iteration may be more detailed than design inputs received during previous iterations, e.g., because the various entities have developed a more detailed view of what they want, how they want it implemented, technical constraints, etc. In this way, FIG. 3 also illustrates a design document hierarchy, with higher-level documents being more general and/or less detailed, and lower-level documents being less general and/or more detailed or focused.

Designing a process automation facility (whether a new process automation facility or updates to an existing facility) may begin at various points with various types of design inputs, depending, for instance, on how much detail the end customer is prepared to provide. Each type of design input may or may not correspond to a level of a design document hierarchy, depending on how those levels are defined and/or delineated.

For purposes of explanation, it will be assumed that the first design input provided by the end customer will be a high-level project specification and/or requirements 312. These data may include, for instance, high-level goal(s) of the process automation system and/or its constituent components. High-level project specification and/or requirements 312 may be provided in various forms of documentation, such as a free-form narrative/prose, flowcharts (e.g., rough PFDs), requirement checklist, and so forth. Another relatively high-level design input is control and safety narrative 314. These data may include, for instance, free-form prose, flowcharts, requirements, and/or other information that conveys how aspects of the process automation system will be controlled, and/or how safety protocols will be implemented.

Another design input that may be received as part of cycle 310 before or after design inputs 312-314 is an operation and alarm management philosophy and/or standard operating procedure (SOP) 316. This data may include, for instance, general guidelines and procedures for operating the process automation system, as well as for triggering alarms in the process automation system.

Further along cycle 310 are design inputs with more detail, and hence may be considered to belong to lower levels of the design document hierarchy. A physical plant layout design input 318 may include, at various levels of detail, information about how a process automation system/facility will be physically laid out. Physical plant layout design input 318 may include, for instance, blue prints, architectural mockups, etc. FIG. 2 depicts one example of how a physical plant layout (200) may be manifested in a document.

An instrumentation database design input 322 may include, for instance, wiring modules $320_1$, an instrument index $320_2$, and/or a plant hierarchy $320_3$. Wiring modules $320_1$ may include, for instance, information about junction boxes (including "smart" junction boxes), hardware cabinets (e.g., on which DCNs, rack servers, etc. are mounted), and so forth. Instrumentation index $320_2$ may include, for instance, a list or database of instruments such as sensors, actuators, DCNs, etc. Plant hierarchy $320_3$ may set forth, for instance, particular areas of the desired process automation plant, as well as units and/or equipment in those areas. Lastly in cycle 310, a process flow diagram (PFD) 326 may be provided, e.g., in conjunction with or based on one or more P&ID diagrams 324.

The various design inputs 312-326 provided during cycle 310 may be provided in any order at any time. Cycle 310 itself may repeat, in its entirety or partially, as more design inputs and/or more details associated with each design input are received. In addition, and using techniques described herein, the various design inputs may be used to automatically generate templates for other design inputs for which information is missing. In some implementations, various design inputs may be mapped to various other design inputs, e.g., across various levels of the design document hierarchy. These mappings may be leveraged as described herein to automate aspects of process automation system design.

For example, one or more of the design inputs for the requested process automation facility may be processed to generate a first embedding. The first embedding may encode one or more aspects of the requested process automation facility at a level of detail or abstraction that is commensurate with the design document hierarchy. The first embedding may be compared to a plurality of first level reference embeddings to select one or more first level reference embeddings that satisfy a first criterion. The plurality of first level reference embeddings may encode aspect(s) of a respective plurality of existing process automation facilities at levels of detail or abstraction that are commensurate with the same level of the design document hierarchy.

Based on a mapping from the selected one or more first level reference embeddings, one or more second level reference embeddings may be identified. In various implementations, each of the one or more second level reference embeddings may encode second level information about a respective one of the plurality of existing process automation facilities at a second level of detail or abstraction that is commensurate with a second level of the design document hierarchy that is generally more focused or detailed than the first level of the hierarchy. Based on the identified one or more second level reference embeddings, one or more template design documents for the requested process automation facility may be provided.

In some implementations, design inputs depicted in FIG. 3 may be contained in a document that can be processed using techniques described herein to extract information for generating template design documents and/or other templates for requested process automation facilities. For example, a variety of different documents that are non-textual or at least partially graphic may be processed, e.g., by intake module 22, to extract features and/or information that can be used by encoder module 24 to generate semantic embeddings. In some implementations, these semantic embeddings may be used and/or stored as parts of federated information models.

Figure 4:
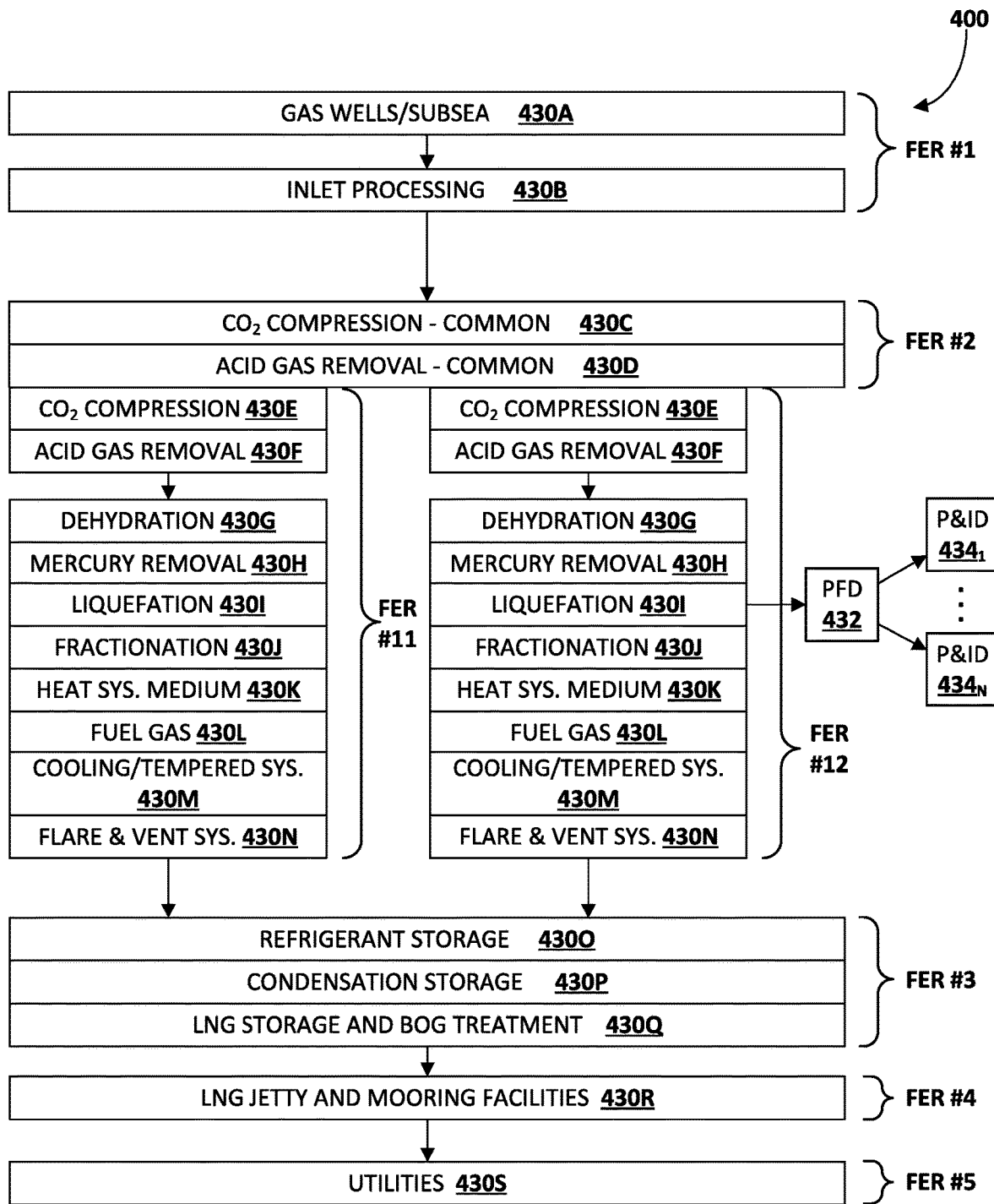
FIG. 4 schematically depicts an example process flow for a process automation facility.

FIG. 4 schematically depicts an example high-level process flow 400 for a hypothetical process automation facility. FIG. 4 demonstrates how various units 430A-S may be implemented in and/or controllable by equipment in (or otherwise associated with) various different FERs, which in FIG. 4 are indicated at right (FER #1, #2, #3, #4, #5, #12) and in the middle (FER #11). Like physical plant layout design input 318 in FIG. 3, process flow 400 depicted in FIG. 4 may be contained in a structured or unstructured document. As described previously, such a document (or portion(s) thereof) may be processed using techniques described herein to generate a semantic embedding. This semantic embedding may be matched to reference embeddings, which in turn include mappings to other embeddings representing (at various levels of the design document hierarchy) other documents (e.g., PFDs, P&IDs, circuit diagrams, etc.) associated with existing process automation facilities. These other documents may be used as bases for template design document(s) for designing a new process automation facility.

Flow proceeds from top to bottom in FIG. 4. The example process depicted in FIG. 4 includes process units that may be implemented as part of a liquid natural gas liquefaction plant, but this is not meant to be limiting. Starting at top, at blocks 430A-B, gas wells for subsea oil extraction, as well as inlet processing, is controlled in a first FER #1. A second FER #2 controls the processes of blocks 430C-D. Block 430C represents a common or shared $CO_2$ compression process unit. Block 430D represents a common or shared acid gas removal process unit.

At this point, the overall process splits into two parallel "trains." The train on the left corresponds to a sequence of processes that are controlled by FER #11. The train on the right corresponds to a sequence of process units that are controlled by FER #12. The two trains are more-or-less identical so only the process units of the first train on the left will be described in detail.

Block 430E corresponds to a $CO_2$ removal process unit that operates exclusively on the oil being processed by the train on the left (controlled by FER #11). Oil processed by the right-hand train (FER #12) is processed by a separate $CO_2$ removal process unit. Similarly, block 430F corresponds to an acid gas removal process unit that operates exclusively on the oil being processed by the train on the left (controlled by FER #11). Moving down the remainder of the left-hand train, block 430G corresponds to a dehydration process unit, block 430H corresponds to a mercury removal process unit, block 430I corresponds to a liquefaction process unit, block 430J corresponds to a fractionation process unit, block 430K corresponds to a heating medium system process unit, block 430L corresponds to a fuel gas process unit, block 430M corresponds to a cooling/tempered system process unit, and block 430N corresponds to a flare and vent system process unit.

Exiting the left-hand train, both trains lead to a refrigerant storage process unit at block 430O. This refrigerant storage process unit 430O, as well as a condensation storage process unit (block 430P) and a liquefied natural gas (LNG) storage and boil-off gas (BOG) treatment process unit (block 430Q), are controllable by FER #3. Output from the process units controlled by FER #4 is then subjected to a LNG jetty and mooring facility process unit at block 430R. This process is controlled by FER #4. Lastly, miscellaneous downstream utilities at block 430S are controlled by FER #5.

Each process unit 430 depicted in FIG. 4 may be implemented using one or more process automation nodes, including but not limited to inputs such as sensors, outputs such as actuators, and other nodes, such as DCNs configured for computing purposes. One or more of process units 430A-S may also be designed using documents such as PFDs and/or P&IDs. Arrows extending from liquefaction process unit 430I in the right-hand process train point to representations of PFD 432 and corresponding P&IDs 434$_{1-N}$ for implementing that liquefaction process unit. These arrows indicate how PFD 432 may correspond (e.g., include) multiple different P&IDs 434$_{1-N}$. Put another way, PFD 432 may belong to a higher level of the design document hierarchy than P&IDs 434$_{1-N}$.

In some implementations, all or portions of process flow 400 may be leveraged to provide template design documents. For instance, information about process units 430A-S of process flow 400 may be extracted, e.g., by intake module 22, from a structured or unstructured document to generate a graph. Encoder module 24 may encode this graph into a reference semantic embedding at a first level of abstraction. Matcher 26 may match this semantic embedding to one or more reference embeddings that represent one or more reference process automation facilities at a similar level of abstraction as process flow 400. These mappings from these reference embeddings may lead to different level reference embeddings. Template module may retrieve documents represented by these different level reference embeddings and return them, e.g., with or without preprocessing to remove transient or irrelevant data.

Figure 5:
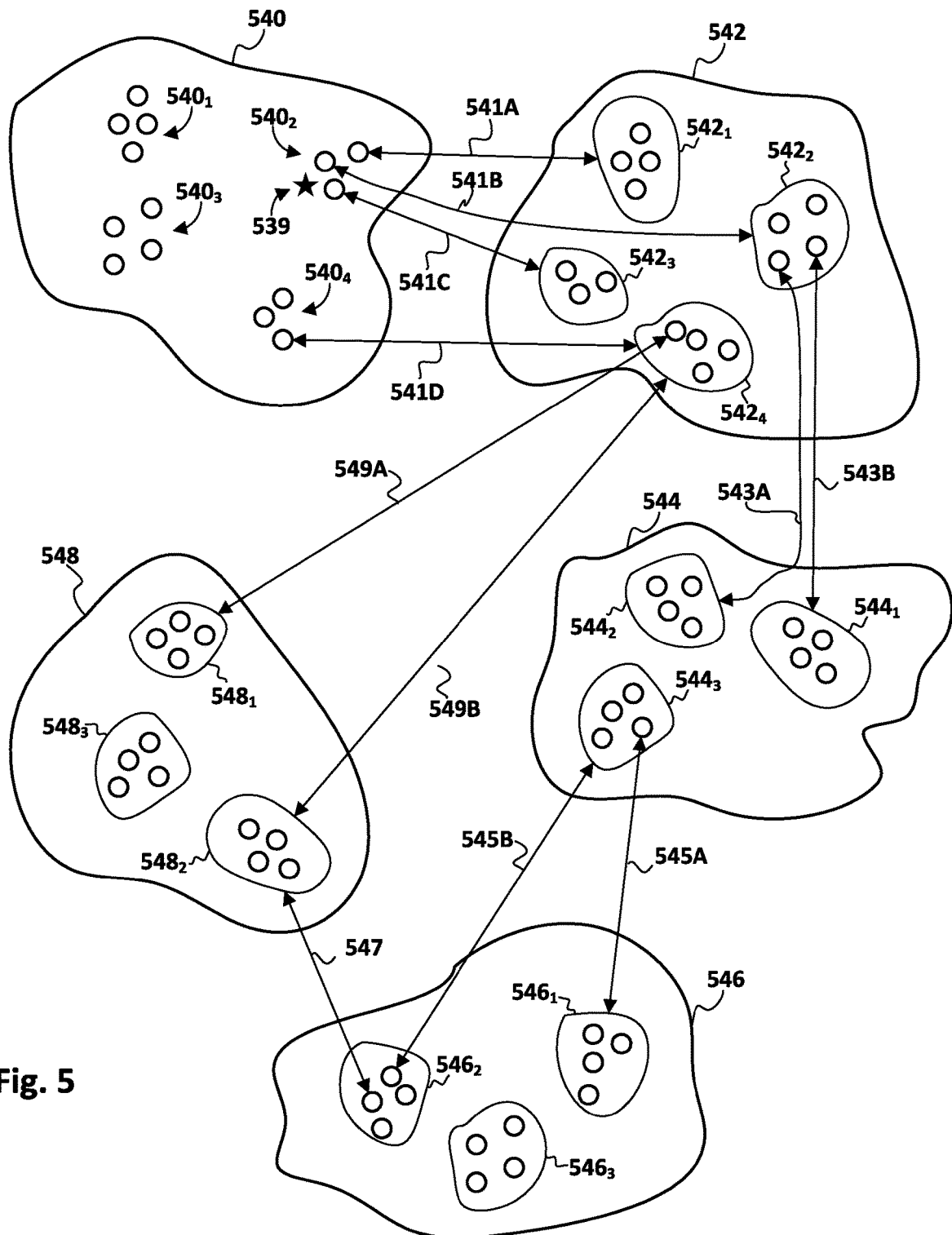
FIG. 5 schematically depicts an example of how embedding spaces, semantic embeddings, and mappings therebetween may be leveraged to automate aspects of process automation facility design.

FIG. 5 schematically depicts examples of how embedding spaces 540, 542, 544, 546, and 548 and mappings therebetween may be leveraged to facilitate provision of template design documents for new or to-be-updated process automation facilities, in accordance with various implementations. Embedding spaces 540, 542, 544, 546, and 548 are depicted in two dimensions. However, this is for ease of understanding only and is not meant to be limiting. Embedding spaces 540, 542, 544, 546, and 548 may have as many dimensions as the individual embeddings contained within. Similarly, it is not necessary that the various documents (or more generally, information at different levels of abstraction) be encoded into separate embedding spaces. Embedding spaces 540, 542, 544, 546, and 548 are depicted as separate spaces in FIG. 5 for ease of understanding only. Moreover, the number of embeddings and embeddings clusters depicted in FIG. 5 is not meant to be limiting, nor are the mappings depicted therebetween. Rather, these are presented for illustrative purposes.

First embedding space 540 includes embeddings (small white circles) that represent "first level" information about a requested process automation facility to generate a first embedding. Each embedding in first embedding space 540 encodes one or more aspects of a process automation facility at a level of detail or abstraction that is commensurate with a first level of the aforementioned design document hierarchy. Examples of first level information for a process automation facility may include, for instance, project specification and/or requirements 312 in FIG. 3, control and safety narratives 314, operation and alarm management and standard operation procedure 316, and other similarly high level information. In many cases, the first level information that is represented by the embeddings in first embedding space 540 may be at a similar level of abstraction as initial information received or provided when designing a new process automation facility.

In FIG. 5, first embedding space 540 includes multiple clusters $540_{1-4}$ of embeddings. Each cluster may include embeddings that encode information about process automation facilities that are similar in various ways. In some implementations, similarity between embeddings in any of the embedding spaces 540, 542, 544, 546, or 548 may be determined by matcher 26 by comparing individual embeddings using techniques such as Euclidean distance, cosine similarity, dot product, etc. For example, first cluster $540_1$ may include embeddings generated based on first level information about natural gas refineries. Second cluster $540_2$ may include embeddings generated based on first level information about offshore oil extraction and processing facilities. Third cluster $540_3$ may include embeddings generated based on first level information about hydraulic fracking facilities. Fourth cluster $540_4$ may include embeddings generated based on first level information about nuclear fuel processing facilities.

Second embedding space 542 includes individual embeddings (small white circles) that represent "second level" information about process automation facilities. Similar to first embedding space 540, each of the one or more second level reference embeddings in second embedding space 542 encodes second level information about an existing process automation facility at a level of detail or abstraction that is commensurate with a second level of the design document hierarchy. For example, each embedding in first embedding space 540 may represent a high-level description (e.g., narrative, specification) of a process automation facility or portion thereof, whereas each embedding in second embedding space 542 may represent a lower-level description of a portion of a process automation facility; in FIG. 2, this will be assumed to be PFD's. Also similar to first embedding space 540, in second embedding space 542, the embeddings are grouped into clusters $542_{1-4}$ of embeddings. In some cases, a cluster of embeddings may represent PFD's that are semantically similar to each other (e.g., represent similar PFDs). Additionally or alternatively, in some implementations, a cluster of embeddings may represent PFDs that are used in the same process automation facility. In this way, second embedding space 542 may be indexed in part based on distinct process automation facilities.

Various mappings are depicted in FIG. 5 as two-way arrows between various embeddings, clusters of embeddings, embedding spaces, etc. Each mapping may represent a similarity function. In some implementations, these mappings (and other mappings depicted in FIG. 5 and described elsewhere herein) may be learned, e.g., using a machine learning model such as a feed-forward neural network. Such a machine learning model may be trained, for instance, using similarity learning techniques such as triplet loss, covariance matrices, locality sensitive hashing, etc. With triplet loss, for instance, a "baseline" or "anchor" input is compared to a "positive" or "truthy" input and a "negative" or "falsy" input. The distance (e.g., Euclidian, cosine similarity, etc.) between the anchor input and the positive input may be minimized. The distance between the anchor input and the negative input may be maximized.

Multiple mappings 541A-D are depicted from embeddings in first embedding space 540 to clusters of embeddings in second embedding space 542. Mappings 541A-D effectively map individual instances (embeddings in first embedding space 540) of first level information about existing and/or historical (collectively, "historical") process automation facilities to clusters of embeddings in second embedding space 542. For instance, first mapping 541A maps an embedding representing first level information for a given process automation facility to first cluster $542_1$ of embeddings representing multiple PFDs associated with (e.g., describing portions of) that same given process automation facility. Second mapping 541B maps an embedding representing first level information for another process automation facility to second cluster $542_2$ of embeddings representing multiple PFDs associated with (e.g., describing portions of) that same process automation facility.

Third mapping 541C maps an embedding representing first level information for a third process automation facility to third cluster $542_3$ of embeddings representing multiple PFDs associated with (e.g., describing portions of) that same third process automation facility. Fourth mapping 541D maps an embedding representing first level information for a fourth process automation facility that is part of a different cluster ($540_4$) to fourth cluster $542_4$ of embeddings representing multiple PFDs associated with (e.g., describing portions of) that same fourth process automation facility. Other mappings are possible but are omitted for the sake of brevity and clarity.

In various implementations, these mappings 541A-D may be leveraged to automate aspects of process automation system design. For example, a user could provide first level design input such as project specifications or requirements 312, e.g., in a document such as an email, PDF, transcription of a phone call or voicemail, etc. This design input may be processed by intake module 22 (e.g., using NLP, OCR, object recognition, etc.) to generate a semantic embedding 539 that is represented in first embedding space 540 as a black star. It can be seen that semantic embedding 539 is proximate to, and therefore similar to, embeddings of second cluster $540_2$ of first embedding space 540. Thus, it is possible to follow any of mappings 541A-C to embedding(s) to second embedding space 542. For instance, semantic embedding 539 is most proximate to an embedding at one end of third mapping 541C, which in turn leads to third cluster $542_3$ of embeddings in second embedding space 542. Accordingly, one or more of the PFDs represented by the embeddings of third cluster $542_3$ of embeddings in second embedding space 542 may be retrieved and provided to the user as a template, either "as is" or after some form of preprocessing is performed (e.g., to remove sensitive, transient, or irrelevant information).

As indicated by the double-headed arrows, mappings 541A-D (and other mappings described herein) are not limited to mapping from a lower level of the design document hierarchy to a lower level. These mappings may be leveraged in reverse as well. For example, a user could provide, as a design input, one or more PFDs 326. These one or more PFDs 326 can be processed in various ways depending on whether they are structured or unstructured to generate semantic embeddings in second embedding space 542. Then, mappings from second embedding space 542 back to first embedding space 540 may be used, for instance, to generate documents that are at a higher level of abstraction than PFD(s) 326, such as project specification/requirements 212, control and safety narratives, etc.

Referring back to FIG. 5, a third embedding space 544 may include embeddings that represent third level information, such as P&IDs 324 used in historical process automation facilities. Third embedding space 544 includes three clusters of embeddings, $544_{1-3}$. Each cluster may include embeddings that are semantically similar to each other, e.g., because the underlying P&IDs have many shared features, the underlying P&IDs were part of the same process automation facility, controlled by the same FER, used in semantically-similar process automation facilities, etc. Similar to before, mappings 543A and 543B may represent similarity functions that are learned between embeddings in second embedding space 542 (which represent individual PFD's) and third level embeddings (representing P&IDs) in third embedding space 544. Thus, and similar to before, a PFD represented by an embedding in second cluster $542_2$ of second embedding space 542 may lead via mapping 543B to first cluster $544_1$ of third embedding space 544. The four embeddings in first cluster $544_1$ may represent four P&IDs 324 that may be provided as template P&IDs for the user.

A fourth embedding space 546 may include, for instance, embeddings (white circles) that represent network topologies used in historical process automation facilities. Fourth embedding space 546 includes three clusters $546_{1-3}$. Each cluster includes embeddings representing network topologies that are semantically similar to each other, were used in similar contexts (e.g., in the same or similar process automation facilities), and so forth.

Two mappings 545A-B are depicted between third embedding space 544 and fourth embedding space 546. One mapping 545A is between an individual embedding representing an individual P&ID in third embedding space 544 to a first cluster $546_1$ of embeddings in fourth embedding space 546 representing four different network topologies. Mapping 545A may indicate, for instance, that the same P&ID was implemented in four different historical process automation facilities in which four different network topologies were implemented.

The other mapping 545B between third embedding space 544 and fourth embedding space 546 is between a cluster $544_3$ of embeddings representing four different P&IDs in third embedding space 544 and an individual embedding representing an individual network topology within second cluster $546_2$ of fourth embedding space 546. Mapping 545B may indicate, for instance, that the same network topology was implemented in four different historical process automation facilities in which four different P&IDs were implemented. Mappings 545A and 545B demonstrate the more general principle that mappings between two given embedding spaces are not limited to clusters on one side and individual embeddings on the other. Rather, individual embeddings in either embedding space may map to clusters or individual embeddings in the other space, and vice versa.

A fifth embedding space 548 is depicted in FIG. 5 that includes embeddings (small white circles) that represent physical plant layouts, such as 200 depicted in FIG. 2. Three clusters $548_{1-3}$ of embeddings are depicted that correspond, for instance, to semantically/physically similar physical plant layouts. Mappings 547 and 549A-B are depicted between fifth embedding space 548 and other embedding spaces in FIG. 5, demonstrating how mappings may be learned between any types of documents and/or levels of the design document hierarchy. For example, mapping 547 extends between an individual network topology of fourth embedding space 546 and second cluster $548_2$ of physical plant layout embeddings in fifth embedding space 548. This may indicate, for instance, that the same network topology was used in the four different physical plant layouts represented by the four embeddings of second cluster $548_2$.

Mapping 549A extends between first cluster $548_1$ of embeddings representing physical plant layouts and an individual PFD embedding in second embedding space 542. This may indicate, for instance, that four different physical plant layouts represented by the embeddings of first cluster $548_1$ all included the same PFD for at least some portion of the process automation facility. Mapping 549B extends between second cluster $548_2$ of embeddings representing physical plant layouts and fourth cluster $542_4$ of embeddings in second embedding space 542. This may indicate, for instance, that four different physical plant layouts represented by the embeddings of second cluster $548_2$ all included the same four PFDs represented by the embeddings of cluster $542_4$.

In some implementations, individual embeddings may represent (e.g., be generated from) underlying graphs. For example, documents such as PFDs, P&IDs, and network topologies may be represented as graphs. With PFDs, for instance, each graph may include a plurality of nodes representing a plurality of processes to be implemented in the requested process automation facility (e.g., such as the processes 430A-S of process flow 400). A plurality of edges may define relationships between the plurality of processes. Such a graph may be encoded, e.g., by encoder module 24 using a GNN, into one of the semantic embeddings depicted in third embedding space 544 in FIG. 5.

In the context of network topologies (e.g., embeddings of fourth embedding space 546), the graph may include a plurality of nodes representing a plurality of process automation nodes (e.g., DCNs) to be implemented in the requested process automation facility. A corresponding plurality of edges may represent network communication channels between the plurality of process automation nodes. Accordingly, each embedding in fourth embedding space 546 in FIG. 5 may represent such a graph. In the context of physical plant layouts (e.g., embeddings of fifth embedding space 548), the graph may include nodes that correspond to areas or process units such as CCRs and FERs, as well as junction boxes, and edges that correspond to network communication channels between the various areas or process units. Accordingly, each embedding in fifth embedding space 548 may represent such a graph.

Figure 6:
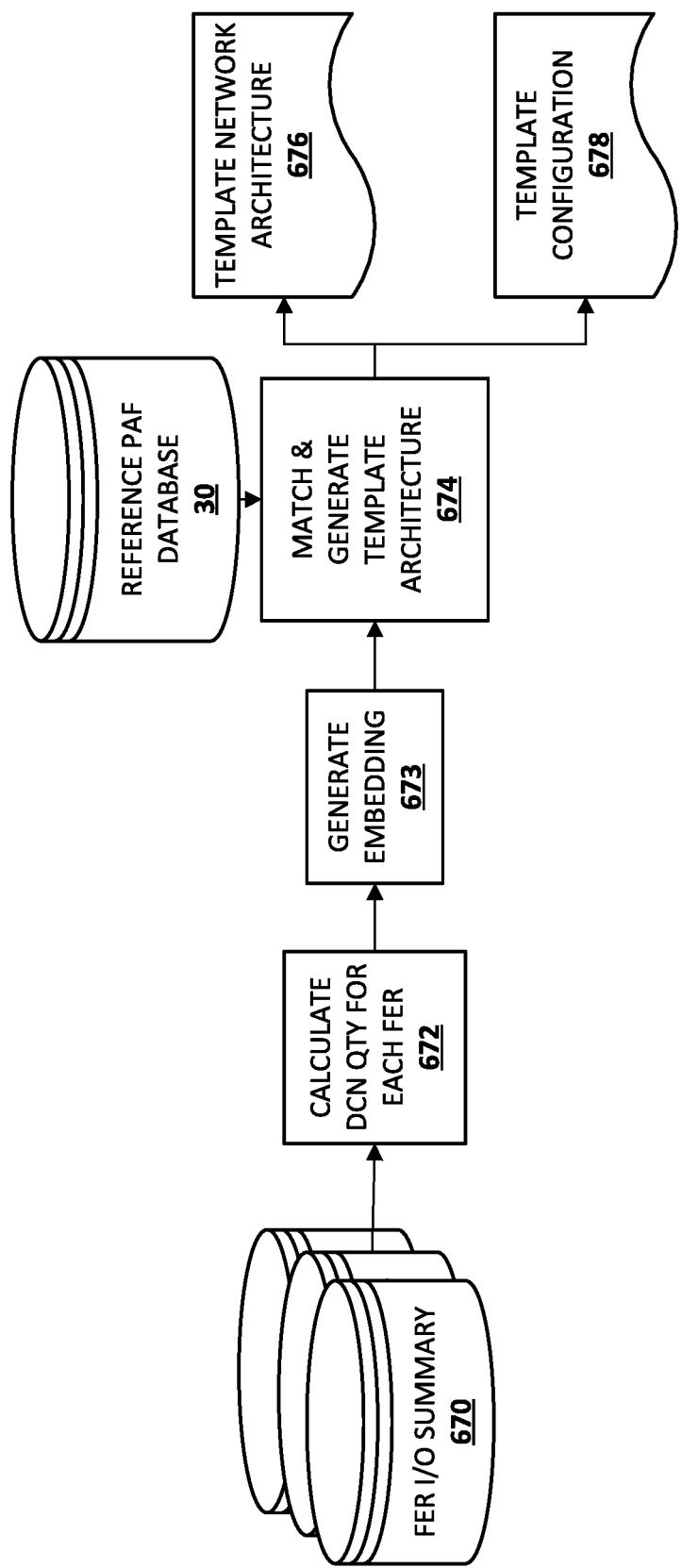
FIG. 6 depicts one example of how design inputs may be processed to generate template design documents.

FIG. 6 schematically depicts one example of how design inputs may be processed to generate template design documents. Starting at left, the design input takes the form of one or more input/output (I/O) summaries 670 for one or more FERs (see 202$_{1-N}$ in FIG. 2). At block 672, a quantity of process automation nodes such as DCNs that will be controlled by and/or otherwise associated with each FER (or process unit) may be calculated based on the corresponding I/O summary 670. In some implementations the quantity of DCNs for a given FER may be estimated at block 672 as follows:

$$\frac{I/O \text{ quantity}}{(\text{maximum } I/O \text{ points in selected } DCN \times (1 - \text{spare\_requirement\%}))} \quad (1)$$

Suppose the spare_requirement % is 25%, or 0.25. If the maximum I/O points in the DCN model to be deployed is one-hundred, the maximum number of I/O points that are available to be assigned to an instance of that DCN during the design phase is seventy-five. If the total quantity of I/O ports in the FER (I/O quantity in equation (1)) is 10,000, the quantity of DCNs that will be required is 134 (10,000/75=133.333 . . . ).

At block 673, an embedding may be created, e.g., by encoder module 24, based on the quantity of DCNs determined at block 672 and all or portions of FER I/O summary 670. At block 674, the embedding may be matched, e.g., by matcher 26, to reference embedding(s) in reference PAF database 30 that represent one or more reference process automation facilities. Based on the matched reference embeddings, template module 28 may generate, retrieve, and/or provide design documents, such as one or more template network architecture drawings 676 and/or one or more template network configurations 678.

Figure 7:
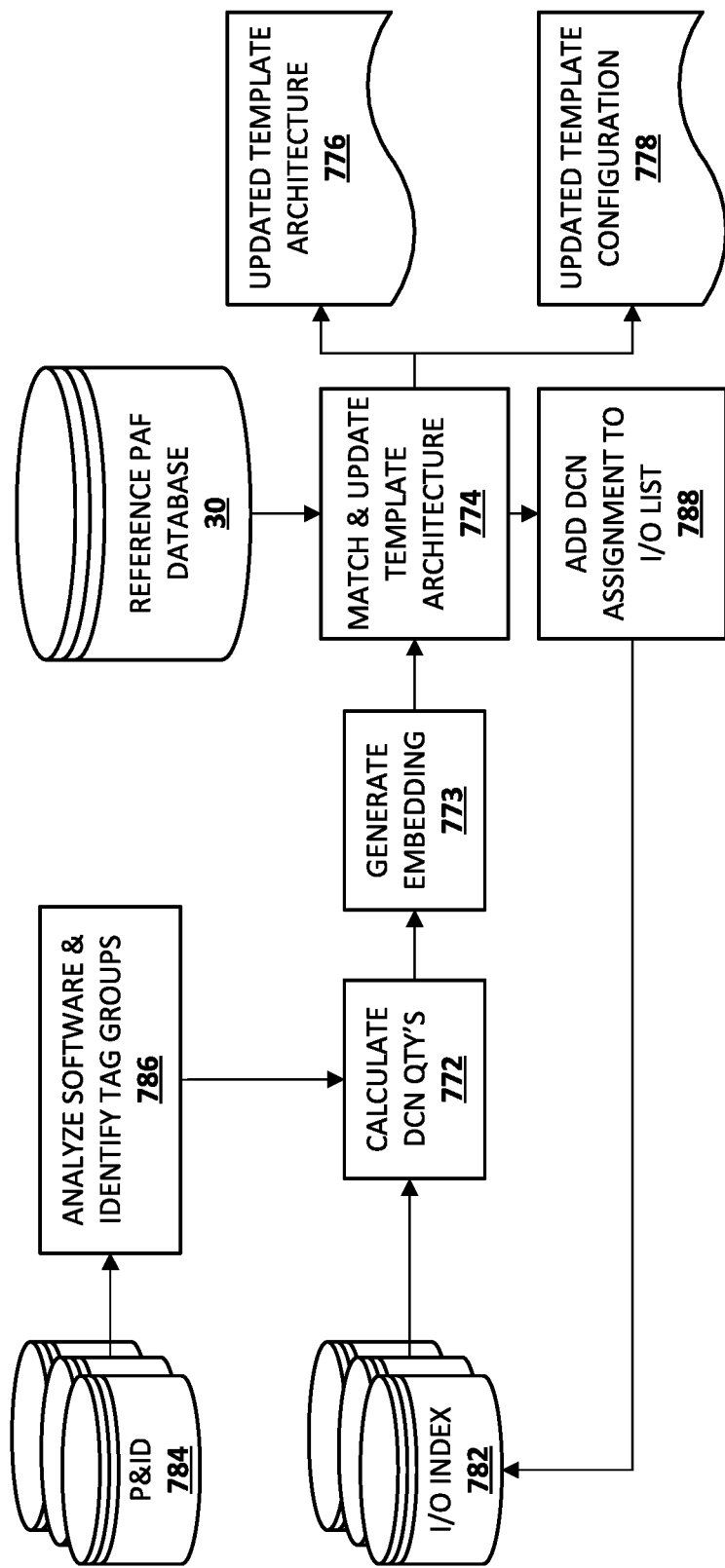
FIG. 7 depicts another example of how design inputs may be processed to generate template design documents.

FIG. 7 depicts another example of how design inputs may be processed to generate template design documents. Many aspects of FIG. 7 are similar to those depicted in FIG. 6. However, FIG. 7 may represent a later stage of the process automation facility design cycle (e.g., 310 in FIG. 3) than FIG. 6. Accordingly, in FIG. 7, more detailed design inputs are available.

Starting once again on the left-hand side, an I/O instrument index 782 (as opposed to a less detailed I/O summary 670 in FIG. 6) for each FER (or process unit) is provided as a design input. Also provided as a design input is one or more P&IDs 784 for each process unit. In some implementations, P&IDs 784 may have been creating using, and/or may take the form of, templates that were generated and/or retrieved using techniques described herein.

Similar to FIG. 6, at block 772, a quantity of process automation nodes such as DCNs that will be controlled by and/or otherwise associated with each FER may be calculated based on the corresponding I/O instrument index 782. In some implementations, the same equation (1) set forth above may be used. Meanwhile, software connection(s) associated with the P&IDs 784 may be analyzed at block 786 to identify a group of tags that form, for instance, a process control loop. In some implementations, these tags may be used as an additional input for the processing at block 772. In some implementations, tags in the same group may be assigned to the same DCN.

At block 773, encoder module 24 may generate an embedding that represents, for instance, the quantity of DCNs calculated at block 772, as well as all or portions of I/O index 782 and P&ID 784 (and tag groups identified at block 786 in some cases). At block 774, the embedding may be matched, e.g., by matcher 26, to reference embedding(s) in reference PAF database 30 that represent one or more one or more reference process automation facilities. Based on the matched reference embeddings, template module 28 may generate, retrieve, and/or provide updated design documents, such as one or more updated template network architecture drawings 776 and/or one or more updated template network configurations 778. At block 788, DCN assignment information determined at block 772 may be used to update the I/O instrument index 782.

Figure 8:
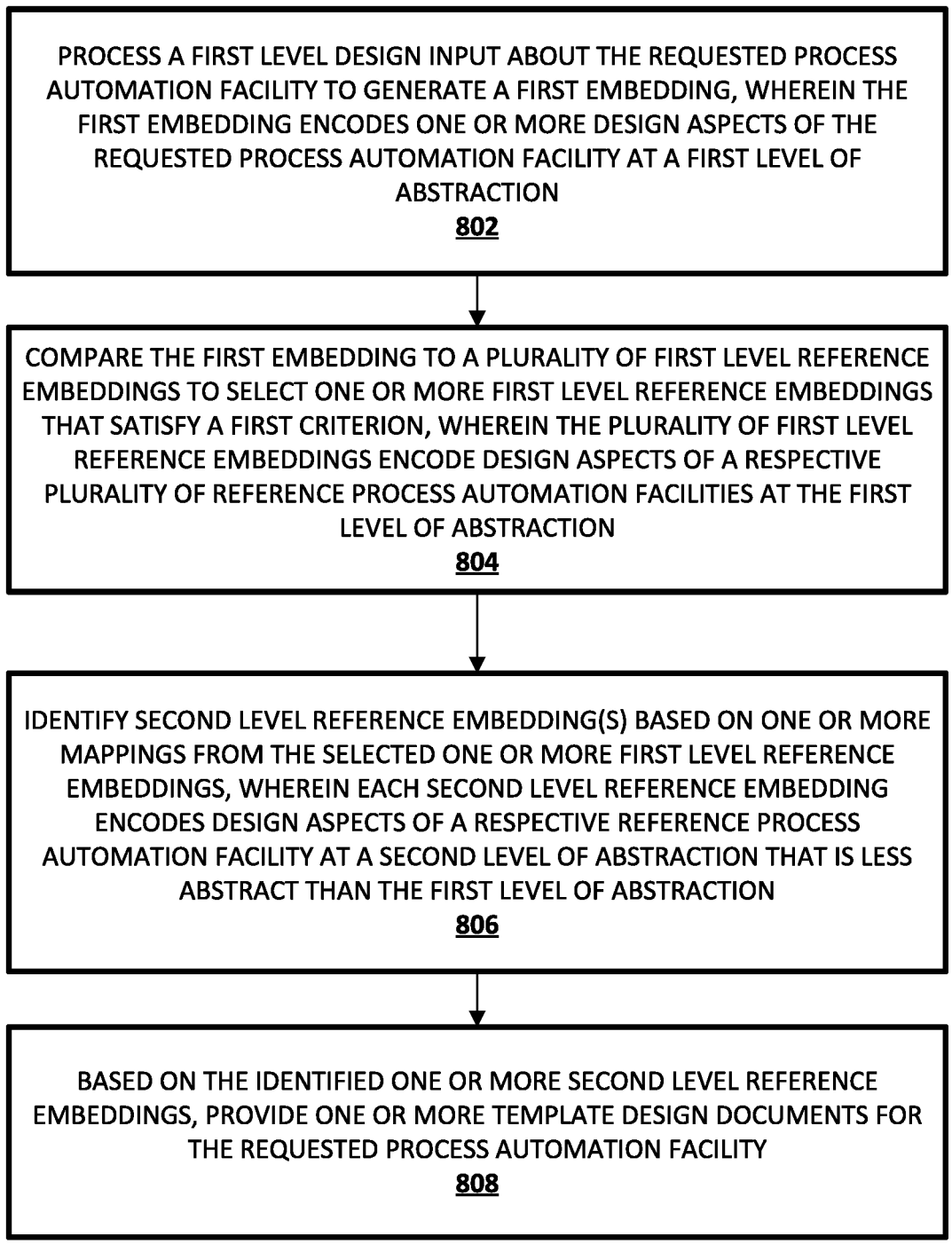
FIG. 8 illustrates an example method for performing selected aspects of the present disclosure.

FIG. 8 is a flowchart illustrating an example method 800 for practicing selected aspects of the present disclosure, in accordance with implementations disclosed herein. For convenience, the operations of the flow chart are described with reference to a system that performs the operations. This system may include various components of various computer systems. Moreover, while operations of method 800 are shown in a particular order, this is not meant to be limiting. One or more operations may be reordered, omitted or added.

At block 802, the system, e.g., by way of intake module 22 and/or encoder module 24, may process one or more first level design inputs about a requested process automation facility to generate a first embedding. Various techniques may be employed to generate the first embedding. If the first level design input(s) include textual data, then various NLP techniques such as word2vec, transformer networks, various types of RNNs, etc., may be employed. If the first level design input(s) include raster graphics, object recognition techniques such as trained machine learning models (e.g., CNNs) may be employed. If the first level design input(s) include a graph with nodes and edges, or other data that can be preprocessed to form such a graph, techniques such as graph neural networks may be employed to create the first embedding. In some implementations in which multiple design inputs are provided, multiple embeddings may be created based on the different modalities (e.g., graph-based, image-based, text-based) of the design inputs. These multiple embeddings may be combined into a in various ways, such as averaging, concatenation, etc.

In some implementations, the first embedding may encode design aspect(s) of the requested process automation facility at a level of detail or abstraction that is commensurate with a high level of the design document hierarchy. In such implementations, the first level design input(s) may include, for instance, one or more relatively high-level design inputs received from an end customer or EPC personnel, such as control narrative, project specification (which may include prose, lists, figures, etc.), and so forth. Other types of design inputs that may not necessarily be created for purposes of design may also be used as such first level design input(s). As one non-limiting example, written correspondence (e.g., letters, emails, text messages) exchanged between interested stakeholders may include high-level information about a desired process automation facility, and therefore may be processed (e.g., using NLP) to generate the first embedding. Transcriptions of voice conversations (in-person or over the telephone) may also be used.

However, first level design input(s) are not required to be at a level of detail that is commensurate with any particular level of the design document hierarchy. As noted previously, mappings such as those depicted in FIG. 4 may be two-way mappings. Accordingly, an embedding representing a document of a relatively low level of the hierarchy (i.e., relatively high level of detail), such as a P&ID for a particular process, may be mapped back to (and ultimately used to generate/select templates of) higher-level documents, such as PDFs, plant layouts, control narratives, project specifications, etc.

Referring back to FIG. 8, at block 804, the system, e.g., by way of matcher 26, may compare the first embedding to a plurality of first level reference embeddings to select one or more first level reference embeddings that satisfy a first criterion. The plurality of first level reference embeddings may encode a respective plurality of reference process automation facilities at a level of detail or abstraction that is commensurate with the first level of the design document hierarchy. In various implementations, the first criterion may include, for instance, a threshold measure of similarity. Such a measure of similarity (which may or may not correspond to distance in embedding space) may be determined using techniques such as Euclidean distance, cosine similarity, dot product, and so forth. As another example, the first criterion may include some number of reference embeddings that are closest and/or most similar to the first embedding in embedding space.

At block 806, the system, e.g., by way of matcher 26, may identify one or more second level reference embeddings based on a mapping from the selected one or more first level reference embeddings. Each of the one or more second level reference embeddings may encode second level information about a respective one of the plurality of existing process automation facilities at a level of detail or abstraction that is commensurate with a different level of the design document hierarchy. Examples of such a mapping were depicted in FIG. 4 as arrows between the various embedding spaces 540, 542, 544, 546, and 548 in FIG. 5.

Based on the identified one or more second level reference embeddings, at block 808, the system may provide one or more template design documents for the requested process automation facility. For example, a second level reference embedding may represent a design document such as a P&ID, PFD, network topology, plant physical layout, etc. This existing document may be retrieved as is and provided to the requesting user, or it may be used to generate a more-generally applicable template; either option effectively bootstraps the design process of the new process automation facility.

In some implementations, one or more of the template design documents may be generated based on "intransient" elements that are shared amongst a plurality of reference design documents associated with (e.g., used to design, implement, build, retool, improve, etc.) reference process automation facilities. These reference design documents may be similar to each other insofar as they may share any number of intransient elements (e.g., matching equipment, matching process units). Likewise, these reference design documents may be different from each other insofar as they contain disparate or "transient" elements. In various implementations, these reference design documents may be used to generate a plurality of reference embeddings, which in turn can be used to generate template design documents that are likely to be useful for building or maintaining another process automation facility.

Suppose a first level reference embedding maps to a cluster of second level reference embeddings, and each of the second level reference embeddings represents design aspect(s) of a different reference process automation facility. In some such implementations, data points that are shared or common amongst the cluster of reference process automation facilities may be identified and used to auto-populate corresponding fields or slots of the template design document. Transient data points that vary amongst the multiple reference process automation facilities, on the other hand, may be discarded or assembled into enumerated lists of selectable options for corresponding fields or slots of the template design document.

Figure 9:
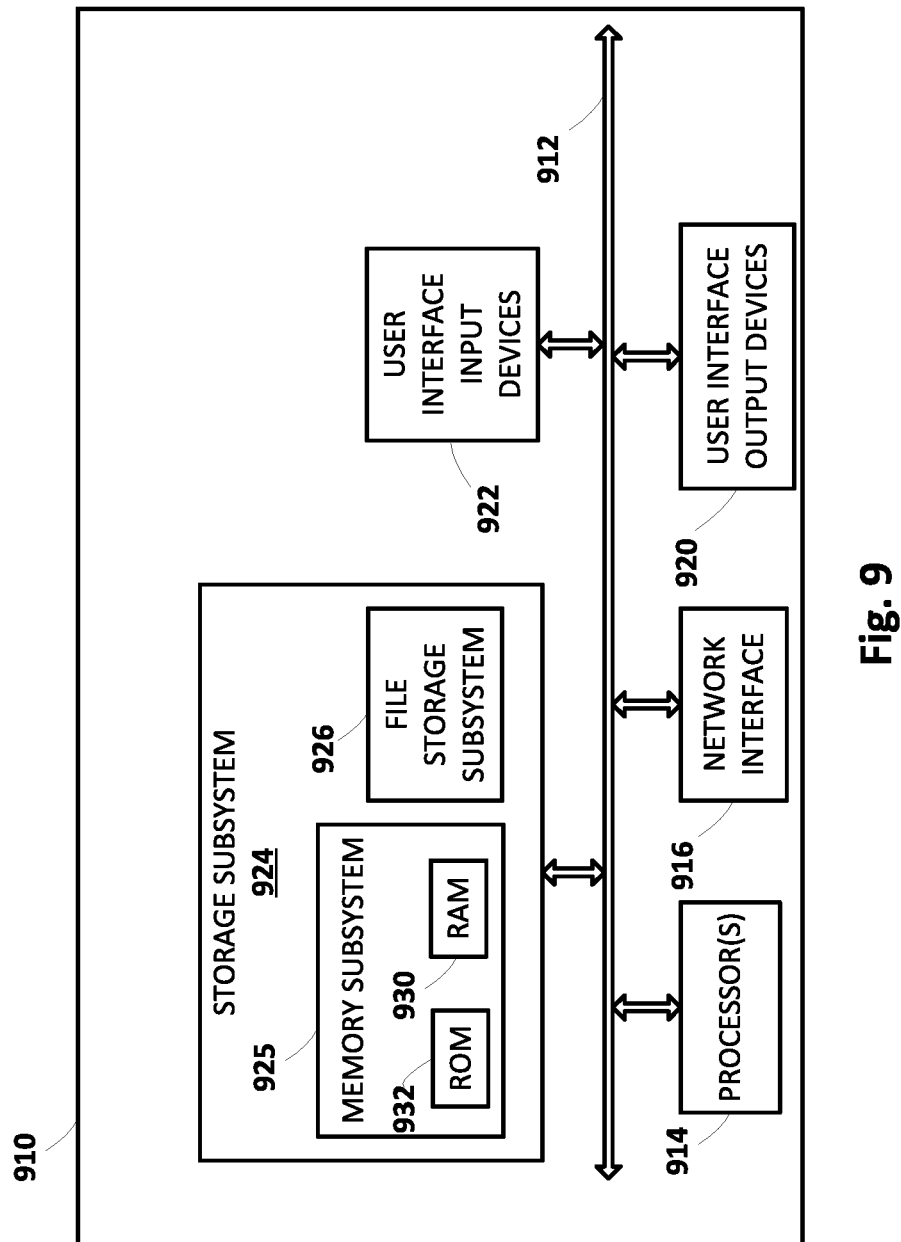
FIG. 9 schematically illustrates an example computer architecture on which selected aspects of the present disclosure may be implemented.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to networks (physical and/or virtual) and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to operate components depicted in FIG. 1, as well as to perform selected aspects of FIGS. 6-8.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD- ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for designing at least part of a requested process automation facility, the method implemented using one or more processors and comprising:
    receiving, at one or more input components, one or more inputs that describe the requested process automation facility;
    based on the one or more inputs, generating a graph that includes a set of design aspects of the requested process automation facility that are conveyed in the one or more inputs;
    processing the graph based on one or more machine learning models to identify one or more reference process automation facilities that are useable to generate design template documents for the requested process automation facility;
    identifying one or more additional design aspects of one or more of the reference process automation facilities that were not contained in the set of design aspects of the requested process automation facility; and
    providing one or more of the identified additional design aspects of one or more of the reference process automation facilities via one or more output devices.

2. The method of claim 1, wherein one or more of the machine learning models comprises a graph neural network (GNN).

3. The method of claim 1, wherein the graph includes a plurality of nodes representing a plurality of processes to be implemented in the requested process automation facility, and a plurality of edges that define relationships between the plurality of processes.

4. The method of claim 1, wherein the graph includes a plurality of nodes representing a plurality of process automation nodes to be implemented in the requested process automation facility, and a plurality of edges that represent network communication channels between the plurality of process automation nodes.

5. The method of claim 1, wherein the graph includes one or more nodes representing one or more modular automated process assemblies to be implemented in the requested process automation facility, and a plurality of edges that define relationships between the one or more modular process automation assemblies and other elements of the requested process automation facility.

6. The method of claim 1, wherein the providing includes, based on the identified additional design aspects of one or more of the reference process automation facilities, providing one or more template design documents for the requested process automation facility.

7. The method of claim 1, wherein the one or more reference process automation facilities comprise a plurality of reference process automation facilities.

8. The method of claim 7, wherein the one or more additional design aspects comprise intransient design aspects that are shared among the plurality of reference process automation facilities.

9. The method of claim 1, further comprising comparing a first embedding generated based on the set of the design aspects of the requested process automation facility using one or more of the machine learning models with reference embeddings generated based on design aspects of a plurality of candidate reference process automation facilities using one or more of the machine learning models, wherein the one or more reference process automation facilities are selected from the plurality of candidate reference process automation facilities based on measures of similarity between the first embedding and the reference embeddings.

10. A system for designing at least part of a requested process automation facility, the system comprising one or more processors and memory storing instructions that, in response to execution of the instructions, cause the one or more processors to
    receive, at one or more input components, one or more inputs that describe the requested process automation facility;
    based on the one or more inputs, generate a graph that includes a set of design aspects of the requested process automation facility that are conveyed in the one or more inputs;
    process the graph based on one or more machine learning models to identify one or more reference process automation facilities that are useable to generate design template documents for the requested process automation facility;
    identify one or more additional design aspects of one or more of the reference process automation facilities that were not contained in the set of design aspects of the requested process automation facility; and provide one or more of the identified additional design aspects of one or more of the reference process automation facilities via one or more output devices.

11. The system of claim 10, wherein one or more of the machine learning models comprises a graph neural network (GNN).

12. The system of claim 10, wherein the graph includes a plurality of nodes representing a plurality of processes to be implemented in the requested process automation facility, and a plurality of edges that define relationships between the plurality of processes.

13. The system of claim 10, wherein the graph includes a plurality of nodes representing a plurality of process automation nodes to be implemented in the requested process automation facility, and a plurality of edges that represent network communication channels between the plurality of process automation nodes.

14. The system of claim 10, wherein the graph includes one or more nodes representing one or more modular automated process assemblies to be implemented in the requested process automation facility, and a plurality of edges that define relationships between the one or more modular process automation assemblies and other elements of the requested process automation facility.

15. The system of claim 10, wherein the instructions to provide include, based on the identified additional design aspects of one or more of the reference process automation facilities, instructions to provide one or more template design documents for the requested process automation facility.

16. The system of claim 10, wherein the one or more reference process automation facilities comprise a plurality of reference process automation facilities.

17. The system of claim 16, wherein the one or more additional design aspects comprise intransient design aspects that are shared among the plurality of reference process automation facilities.

18. The system of claim 10, further comprising instructions to compare a first embedding generated based on the set of the design aspects of the requested process automation facility using one or more of the machine learning models with reference embeddings generated based on design aspects of a plurality of candidate reference process automation facilities using one or more of the machine learning models, wherein the one or more reference process automation facilities are selected from the plurality of candidate reference process automation facilities based on measures of similarity between the first embedding and the reference embeddings.

19. A non-transitory computer-readable medium comprising instructions that, in response to execution of the instructions by a processor, cause the processor to:

receive, at one or more input components, one or more inputs that describe the requested process automation facility;

based on the one or more inputs, generate a graph that includes a set of design aspects of the requested process automation facility that are conveyed in the one or more inputs;

process the graph based on one or more machine learning models to identify one or more reference process automation facilities that are useable to generate design template documents for the requested process automation facility;

identify one or more additional design aspects of one or more of the reference process automation facilities that were not contained in the set of design aspects of the requested process automation facility; and provide one or more of the identified additional design aspects of one or more of the reference process automation facilities via one or more output devices.

20. The non-transitory computer-readable medium of claim 19, wherein one or more of the machine learning models comprises a graph neural network (GNN).

\* \* \* \* \*